US012755273B2

(12) United States Patent
Lok et al.

(10) Patent No.: US 12,755,273 B2
(45) Date of Patent: Oct. 6, 2026

(54) EXTENSION OF SECURE INFORMATION WITHIN DATA STORE

(71) Applicant: Wells Fargo Bank, N.A., San Francisco, CA (US)

(72) Inventors: Robin H. Lok, San Francisco, CA (US); Caroline A. Machado, San Francisco, CA (US); Tiffany N. Twilley, San Francisco, CA (US); Young M. Yang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/742,276

(22) Filed: Jun. 13, 2024

(65) Prior Publication Data

US 2025/0384426 A1 Dec. 18, 2025

(51) Int. Cl.
*G06Q 20/36* (2012.01)
*G06Q 20/40* (2012.01)

(52) U.S. Cl.
CPC .................................. *G06Q 20/363* (2013.01)

(58) Field of Classification Search
CPC ............. G06Q 20/363; G06Q 20/3674; G06Q 20/4014
USPC ............................................................ 705/67
See application file for complete search history.

(56) References Cited

U.S. PATENT DOCUMENTS

| | | | | |
|---|---|---|---|---|
| 2022/0070178 | A1* | 3/2022 | Lee | H04L 63/0876 |
| 2022/0076262 | A1* | 3/2022 | Boyd | G06Q 20/38215 |
| 2024/0403399 | A1* | 12/2024 | Hsu | G06F 21/32 |

OTHER PUBLICATIONS

Mobile Driver's License Implementation Guidelines: Version 1.2, American Association of Motor Vehicles Administrators, 60 pages, Jan. 2023 (Year: 2023).*

ISO/IEC DIS 18013-5, Draft International Standard, Part 5: Mobile driving licence (mDL) application, ISO/IEC 2020, Dec. 10, 2019, 126 pages (Year: 2019).*

* cited by examiner

*Primary Examiner* — James D Nigh
(74) *Attorney, Agent, or Firm* — Merchant & Gould P.C.

(57) ABSTRACT

An example computer system for extending secure information stored within a mobile wallet can include: one or more processors; and non-transitory computer-readable storage media encoding instructions which, when executed by the one or more processors, causes the computer system to: store a mobile driver's license of an individual in the mobile wallet; add extended information to the mobile wallet that is associated with the mobile driver's license, the extended information being additional authentication information associated with the individual; receive a request to authenticate the individual, the request including request information; calculate an authentication score based upon a comparison of the request information to the extended information; and return a determination of authentication in response to the request.

17 Claims, 4 Drawing Sheets

EXTENSION OF SECURE INFORMATION WITHIN DATA STORE

BACKGROUND

It is now common for sensitive information to be stored on mobile and other computing devices. For instance, mobile wallets and mobile driver's licenses can be stored and accessed on computer devices, thereby decreasing the insecurities associated with carrying physical copies of such items. However, the amount and type of information that can be stored within these electronic constructs are limited.

SUMMARY

Examples provided herein are directed to the extension of secure information within a data store.

According to one aspect, an example computer system for extending secure information stored within a mobile wallet can include: one or more processors; and non-transitory computer-readable storage media encoding instructions which, when executed by the one or more processors, causes the computer system to: store a mobile driver's license of an individual in the mobile wallet; add extended information to the mobile wallet that is associated with the mobile driver's license, the extended information being additional authentication information associated with the individual; receive a request to authenticate the individual, the request including request information; calculate an authentication score based upon a comparison of the request information to the extended information; and return a determination of authentication in response to the request.

According to another aspect, an example method for extending secure information stored within a mobile wallet can include: storing a mobile driver's license of an individual in the mobile wallet; adding extended information to the mobile wallet that is associated with the mobile driver's license, the extended information being additional authentication information associated with the individual; receiving a request to authenticate the individual, the request including request information; calculating an authentication score based upon a comparison of the request information to the extended information; and returning a determination of authentication in response to the request.

The details of one or more techniques are set forth in the accompanying drawings and the description below. Other features, objects, and advantages of these techniques will be apparent from the description, drawings, and claims.

DETAILED DESCRIPTION

This disclosure relates to the extension of secure information within a data store.

The addition of an individual's mobile driver's license (mDL) to a secure data store, such as mobile wallet of a mobile computing device, has many advantages, such as allowing users to easily provide proof of identity. However, the mDL can be limited to the information included within a driver's license. For example, a mDL may not include other information associated with the individual, such as an email address or phone number.

The concepts provided herein allow the information stored by the mDL within the mobile wallet to be extended or otherwise enhanced. For instance, the mDL within the mobile wallet can advantageously allow the individual to configure values for additional information data fields within the mobile wallet. These values may be determined to be authentic when stored in the mobile wallet that also includes the mDL for the individual. These authenticated user information values can then be used to verify various actions, thereby resulting in the practical application of the detection of potentially fraudulent activity.

These concepts therefore allow for extending a government-issued document (e.g., the mDL) by linking it with additional data to provide an authenticated user information data set that can be used for various purposes. Configuration of values that include additional user information fields requires the presence of the mDL to verify the user's identity. Values from the mDL within the authenticated user information data set are tied to the information included in the mDL and may be immutable to change by the user.

This, in turn, can enable fraud detection based on identity information hosted in a central, trusted source (e.g., the mobile wallet with the mDL) that is maintained by the user. This allows for enhanced fraudulent detection by considering other user information data that is not currently included in a user account but is still legitimate. This can be useful for users who may utilize multiple email addresses, phone numbers, or residential addresses.

Figure 1:
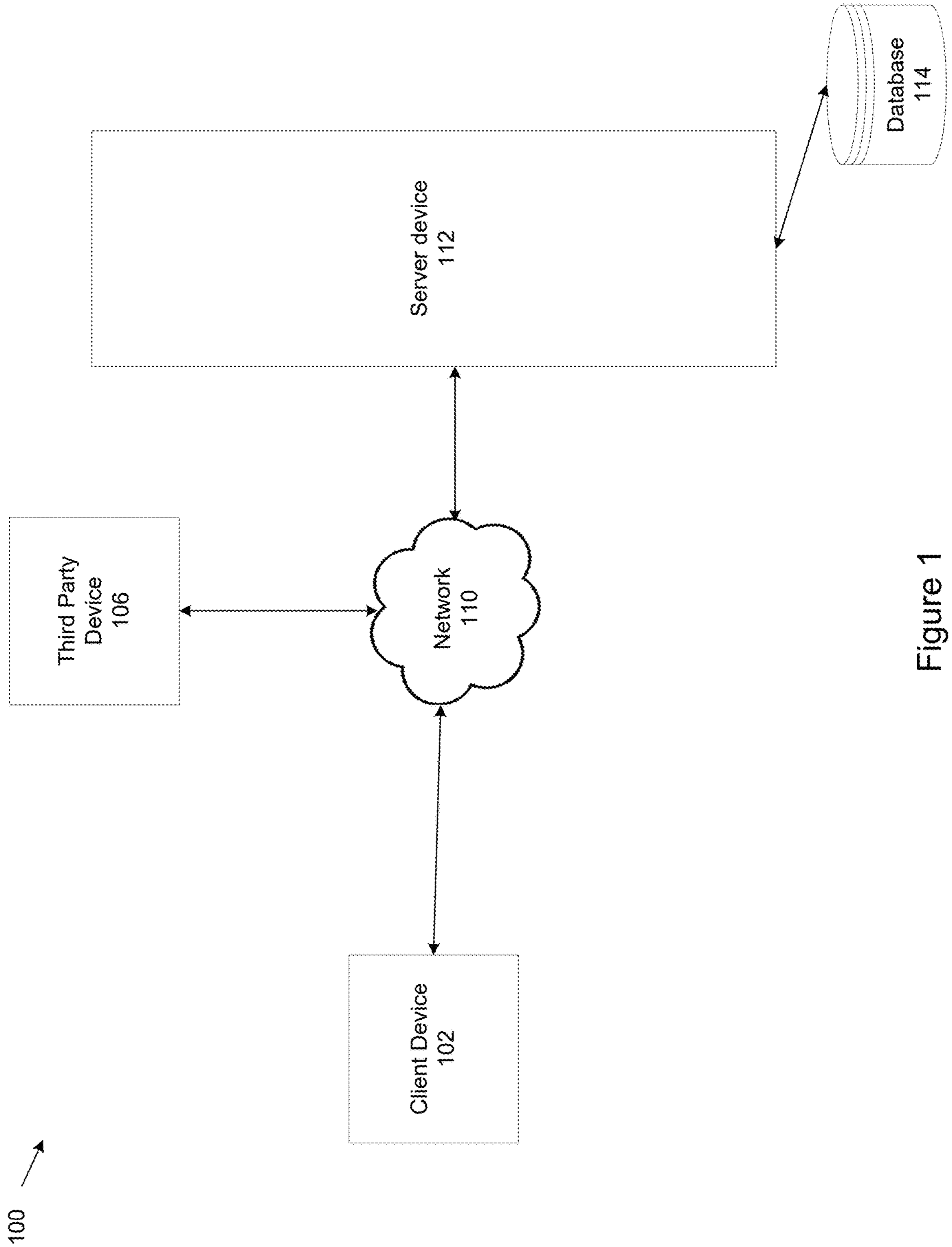
FIG. 1 shows an example system for extending secure information within a data store.

FIG. 1 schematically shows aspects of one example system 100 programmed to extend secure information within a data store. In this example, the system 100 can be a computing environment that includes a plurality of client and server devices. In this instance, the system 100 includes a client device 102, a third party device 106, a server device 112, and a database 114. The client device 102 and the third party device 106 can communicate with the server device 112 through a network 110 to accomplish the functionality described herein.

Each of the devices may be implemented as one or more computing devices with at least one processor and memory. Example computing devices include a mobile computer, a desktop computer, a server computer, or other computing device or devices such as a server farm or cloud computing used to generate or receive data.

In some non-limiting examples, the server device 112 is owned by a financial institution, such as a bank. The client device 102 and the third party device 106 can be programmed to communicate with the server device 112 to extend secure information within a data store. Many other configurations are possible.

The example client device 102 is programmed to provide various functionality to the individual, such as smartphone capabilities. As part of this functionality, the client device 102 securely stores a mobile wallet with various information about the user. Such information can include, without limitation, credit cards, e-tickets, coupons, and other digital items can be stored in the mobile wallet. Further, the mobile wallet includes functionality to use communication features of an associated device to communicate with other devices to access the stored items. For example, the individual can place the client device 102 with the mobile wallet that includes a credit card near a payment device to pay for items.

User accounts can also be associated with the mobile wallet. For example, the virtual identifications can be stored in the mobile wallet of the client device 102. Virtual IDs often include important user information. For example, a virtual ID may be a mobile driver's license. The mobile driver's license can include various information about the user. This information can include a permanent physical address, driver's license number, date of birth, and other associated information. Further, the information may be information submitted to the government for official identification purposes.

Information stored in the mobile wallet can be secured through various mechanism. For instance, the information can be encrypted or otherwise protected from unauthorized access or change. Examples of existing mobile wallets include, without limitation, Wallet from Apple Inc. and Google Wallet from Google LLC.

The example third party device 106 is programmed to make a request to authenticate the individual. This can occur, for example, when the client device 102 is used to conduct a transaction with a third party, such as the operator of the third party device 106. For instance, the third party device 106 can communicate with the system 100 when the individual uses the client device 102 to create an account on the third party device 106. In such an instance, the third party device 106 can query the system 100 for authentication, as provided further below. See FIG. 3.

The example server device 112 is programmed to facilitate the storage of data on the client device 102. For instance, the server device 112 can synchronize various information with the wallet of the client device 102, such as the credit cards, e-tickets, coupons, mDLs, and other digital items. Further, the server device 112 facilitates the extension of the data that is stored in the mobile wallet, which can also be synchronized with the client device 102. For instance, as provided further below, the server device 112 can be programmed to allow for additional information to be stored in the mobile wallet beyond that typically held by the mDL. Additional details are provided below. See FIGS. 2-3.

In one example, the mobile wallet is stored on the client device 102 and synchronized with the server device 112. In other examples, the mobile wallet is stored on the server device 112, and the client device 102 queries the server device 112 for information in the mobile wallet when needed. In the examples discussed below, it is assumed that the mobile wallet is stored on the server device 112 and synchronized with the client device 102. The server device 112 may manage the mobile wallet on the client device 102, and the client device 102 can send stored virtual representations of payment cards, mDL, and other digital items in the mobile wallet to the server device 112 for storage in the cloud. Other configurations are possible.

The example database 114 is programmed to store information for the system 100. For instance, the database 114 can store information associated with the mobile wallet of the individual.

The network 110 provides a wired and/or wireless connection between the client devices 102, 106 and the server device 112. In some examples, the network 110 can be a local area network, a wide area network, the Internet, or a mixture thereof. Many different communication protocols can be used. Although only three devices are shown, the system 100 can accommodate hundreds, thousands, or more of computing devices.

Figure 2:
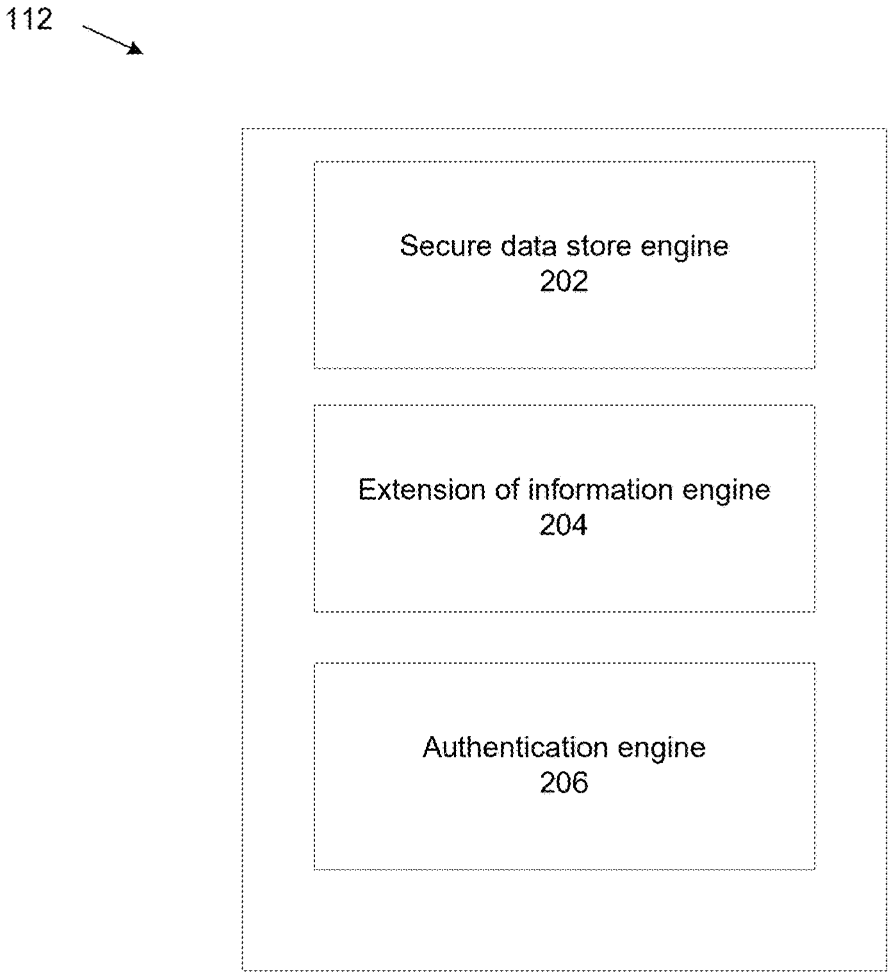
FIG. 2 shows example logical components of a server device of the system of FIG. 1.

Referring now to FIG. 2, additional details of the server device 112 are shown. In this example, the server device 112 has various logical engines that assist in the extension of the secure information that is stored within the mobile wallet. The server device 112 can, in this instance, include a secure data store engine 202, an extension of information engine 204, and an authentication engine 206. In other examples, more or fewer engines providing different functionality can be used.

The secure data store engine 202 is programmed to facilitate the storage of secure information on the client device 102. For instance, the server device 112 can be programmed to synchronize the information associated with payment cards, like credit cards, with the mobile wallet of the client device 102.

Further, the server device 112 is programmed to facilitate the storage of the mDL on the client device 102. For instance, the server device 112 can download the mDL for a third party source, such a governmental agency like a department of motor vehicles computing device. The server device 112 thereupon facilitates the storage of the mDL in the mobile wallet of the client device 102.

The extension of information engine 204 is programmed to extend the information that is stored in the mobile wallet for the individual.

For instance, once the mDL is added to the mobile wallet, the individual may additionally configure values for additional information data fields to be securely stored in the mobile wallet and associated with the mDL by the extension of information engine 204. In examples, these additional information can include, without limitation, email addresses, phone numbers, other residential addresses, usernames, and/or the like.

Since this additional information is securely stored by the extension of information engine 204 and associated with the mDL of the individual, this additional information are deemed "ground truth" data elements associated with the individual. For example, the user may include an email address used to interact with one or more of the user accounts. This email address can be stored as part of the extended information in the mobile wallet and associated with the mDL for authentication purposes, as described further below.

Additionally, information included in the mDL may be immutable to change by the individual. The authenticated user information data set may include authenticated user information data values for authenticated user information data fields based on the mDL and provided additional user information. Modifications to some additional user information data fields requires the presence of the mDL in a request for modification, such as to the governmental agency that issued the mDL. Furthermore, additional user information data fields associated with information from the mDL may only be changed through the receipt of an updated mDL.

For example, assume that the mDL is stored in the mobile wallet on the server device 112 (which is synchronized with the client device 102). This mDL can provide the following information that is securely stored in the mobile wallet.

| Name | Address | Birthdate | Sex | Eyes | Height | Weight | Issued | Expires | Number |
|---|---|---|---|---|---|---|---|---|---|
| John Doe | 100 Main Street | Jan. 1, 1970 | M | Blue | 5-9 | 160 | August 2024 | August 2026 | P123456 |

The extension of information engine 204 is programmed to allow for additional information to be stored in the mobile wallet and associated or otherwise linked with the mDL. This additional information is not provided by the government agency that issued the mDL, but the information is deemed to be immutable because of its association with the mDL in the mobile wallet. For instance, the following additional information can be added to the mobile wallet and associated with the mDL.

| Name | Address | Birthdate | Sex | Eyes | Height | Weight | Issued | Expires | Number | Email | Phone |
|---|---|---|---|---|---|---|---|---|---|---|---|
| John Doe | 100 Main Street | Jan. 1, 1970 | M | Blue | 5-9 | 160 | August 2024 | August 2026 | P123456 | john@email.com | 111-222-3333 |

In this example, the extension of information engine 204 allows for the additional information of an email address and phone number to be added to the secure data stored in the mobile wallet. This additional information can be used for authentication purposes, as described in the following.

The authentication engine 206 is programmed to provide authentication based upon the information that is secured in the mobile wallet of the server device 112.

For example, a third-party device (e.g., the third party device 106) may provide a request for authentication in response to receipt of a user account action (e.g., a password reset request, modification of user information, and/or the like). The request for authentication may include parameters of the received user account action (e.g., email address used, phone number used, device identifier used, location information, and/or the like). The authentication engine 206 can be programmed to access the mobile wallet and compare the authenticated user information data set to the user account action parameters to perform authentication.

The authentication engine 206 can further be programmed to determine an authentication score indicating whether the user account action is legitimate. Alternatively, the mobile wallet may provide the entity device with relevant authenticated user information data values from the authenticated user information data set via the user device so the entity device can determine this likelihood directly.

To determine an authentication score, the authentication engine 206 can compare the information in the mobile wallet with the request. This can include the information from the mDL and the extended information that is stored in the mobile wallet and associated with the mDL. Based upon this comparison, the authentication engine 206 can provide the authentication score that indicates whether or not authentication was successful. For instance, in one example, the authentication engine 206 is programmed to determine the authentication score from 0-10, with “10” being the highest likelihood that the authentication is proper, and “0” being the lowest.

If the authentication score from the authentication engine 206 meets a corresponding threshold (e.g., greater than 8 on the 0-10 scale), the third-party system may determine that the user account action came from the user and is therefore legitimate. Alternatively, if the authentication score is not sufficient, this may be indicative that the user account action came from a source other than the user and is therefore likely fraudulent. In this case, the entity device may require additional verification procedures or may block the user account action entirely.

Furthermore, the mobile wallet may also be configured to store a denial data set that comprises values for information data fields that were determined to be associated with a fraudulent user account action. This may be particularly useful for users experiencing repeated fraudulent user account access attempts from a single user. The denial data set may also be used when determining the authentication score.

Figure 3:
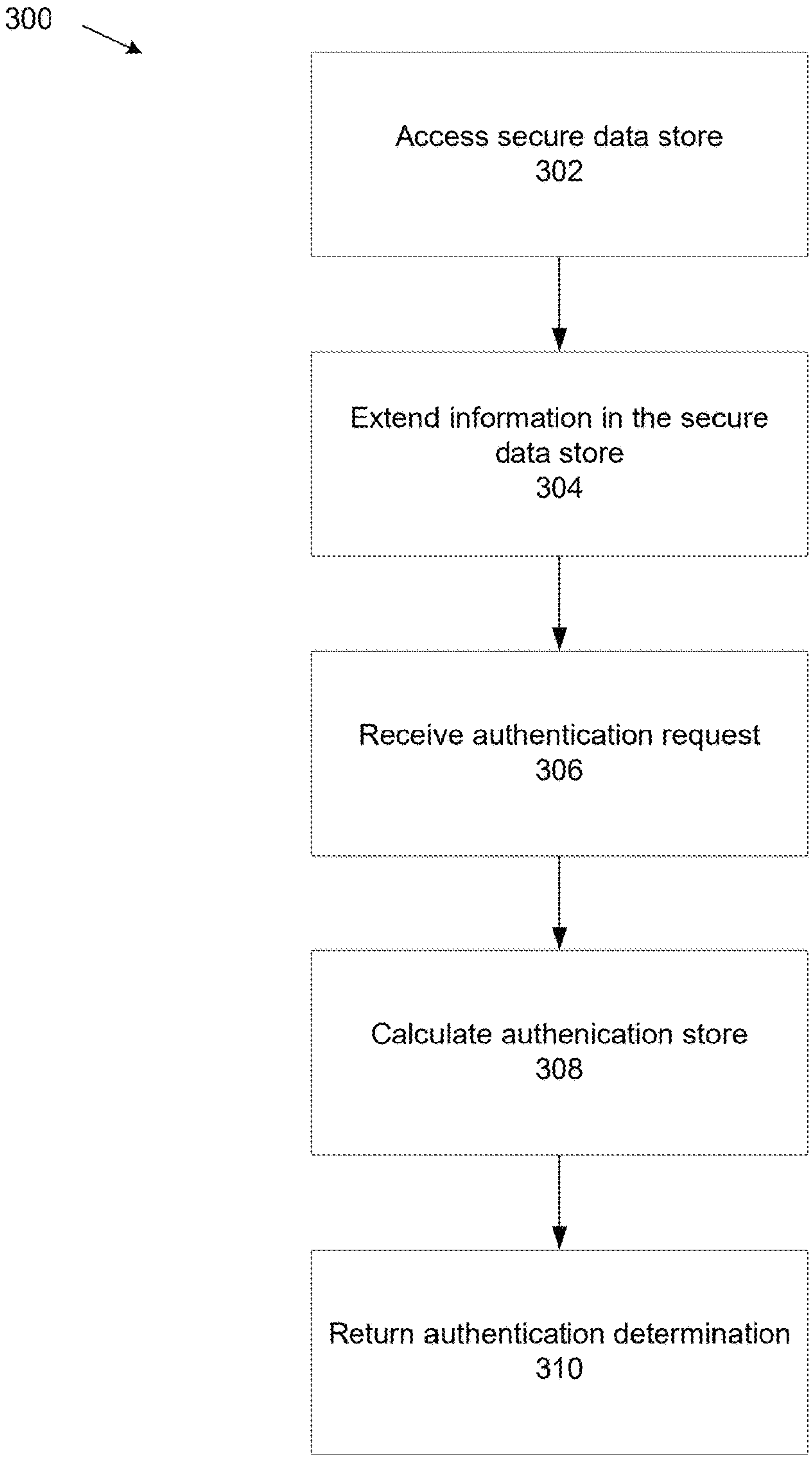
FIG. 3 shows an example method for extending secure information as executed by the server device of FIG. 2.

FIG. 3 shows an example method 300 that can be performed by the system 100.

At operation 302, access is provided to the information that is secured in the data store, such as the smart wallet.

Next, at operation 304, the information that is stored in the wallet is extended. This can include, for instance, adding an email address to the mDL stored in the mobile wallet.

At operation 306, an authentication request is received. For instance, a request can be received from a third party attempting to authenticate the individual to allow the individual to access an account. This request can include various information, including the email address from which the individual has made the request to access the account.

Next, at operation 308, an authentication score is calculated based upon the information in the mobile wallet, including the extended information. For example, the authentication score can be increased when the email address described provided in the request matches an email address included in the authenticated user information data set in the mobile wallet. In such a scenario, the authentication score is increased.

Finally, at operation 310, the authentication determine is returned to the requester. This determination can include a simply “Positive” or “Negative” for the authentication. Further, the actual authentication score can also be included. This would allow the third party to determine how confident the authentication determination is. For instance, This may allow the entity device to proceed with the user account action without further verification.

Many alternative configurations are possible to the examples provided herein. For instance, the embodiments described above use an mDL as the authoritative digital item in the mobile wallet. In other embodiments, other types of identification mechanisms can be used. For instance, an electronic passport could also be stored in a mobile wallet and used alongside the enhanced information described herein for authentication purposes.

Figure 4:
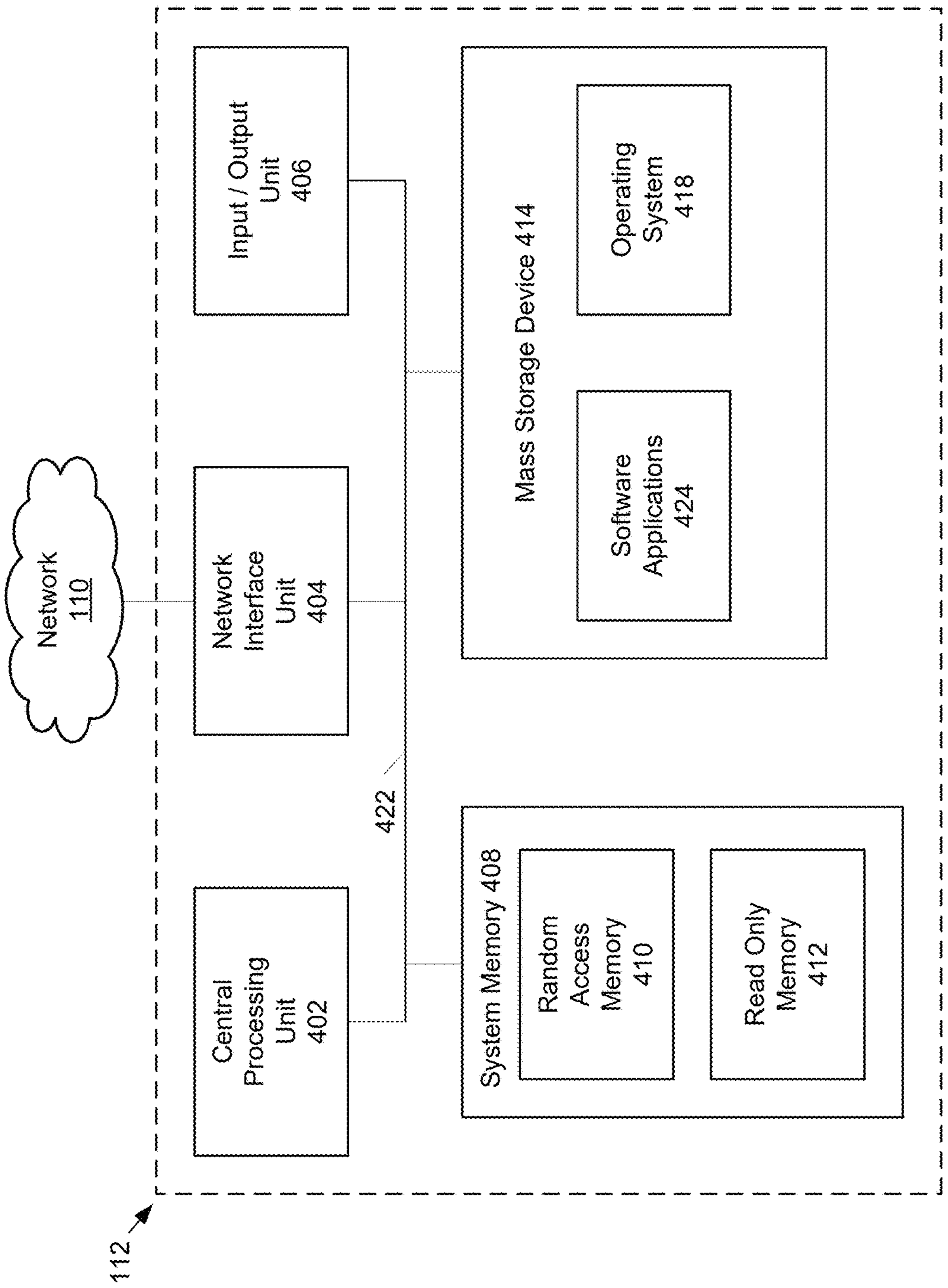
FIG. 4 shows example physical components of the server device of FIG. 2.

As illustrated in the embodiment of FIG. 4, the example server device 112, which provides the functionality described herein, can include at least one central processing unit (“CPU”) 402, a system memory 408, and a system bus 422 that couples the system memory 408 to the CPU 402. The system memory 408 includes a random access memory (“RAM”) 410 and a read-only memory (“ROM”) 412. A basic input/output system containing the basic routines that help transfer information between elements within the server device 112, such as during startup, is stored in the ROM 412. The server device 112 further includes a mass storage device 414. The mass storage device 414 can store software instructions and data. A central processing unit, system memory, and mass storage device similar to that shown can also be included in the other computing devices disclosed herein.

The mass storage device 414 is connected to the CPU 402 through a mass storage controller (not shown) connected to the system bus 422. The mass storage device 414 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 404 connected to the system bus 422. It should be appreciated that the network interface unit 404 may also be utilized to connect to other types of networks and remote computing systems. The server device 112 also includes an input/output controller 406 for receiving and processing input from a number of other devices, including a touch user interface display screen or another type of input device. Similarly, the input/output controller 406 may provide output to a touch user interface display screen or other output devices.

As mentioned briefly above, the mass storage device 414 and the RAM 410 of the server device 112 can store software instructions and data. The software instructions include an operating system 418 suitable for controlling the operation of the server device 112. The mass storage device 414 and/or the RAM 410 also store software instructions and applications 424, that when executed by the CPU 402, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for extending secure information stored within a mobile wallet, comprising:

one or more processors; and non-transitory computer-readable storage media encoding instructions which, when executed by the one or more processors, cause the computer system to:

store a mobile driver's license of an individual in the mobile wallet, wherein the mobile wallet is a program executed on the computer system, and wherein the mobile wallet stores additional digital items including at least one payment credential comprising a virtual representation of a payment card synchronized with the mobile wallet and usable to conduct a transaction;

receive extended information from the individual upon verification of the individual using the mobile driver's license, wherein the extended information is configurable by the individual;

add the extended information to the mobile wallet that is associated with the mobile driver's license, the extended information being additional authentication information associated with the individual and stored as authenticated ground-truth data elements deemed authentic based on an association with the mobile driver's license;

store a denial data set in the mobile wallet, the denial data set comprising values for information data fields determined to be associated with a fraudulent user account action, wherein the denial data set is populated based upon multiple fraudulent user account access attempts;

receive a request from a third party device to authenticate the individual in response to a user account action of the individual with the third party device, the request including parameters of the user account action as request information, wherein the parameters include at least one of an email address used in the user account action, a phone number used in the user account action, a device identifier, and location information;

calculate an authentication score based upon a comparison of the request information to the extended information and the denial data set; and return a determination of authentication to the third party device in response to the request, the determination indicating whether the user account action is legitimate or potentially fraudulent.

2. The computer system of claim 1, wherein the extended information is at least one of an email address and a phone number.

3. The computer system of claim 1, comprising further instructions which, when executed by the one or more processors, cause the computer system to associate the extended information with the mobile driver's license.

4. The computer system of claim 3, wherein the extended information is immutable.

5. The computer system of claim 1, wherein the request is associated with accessing an account.

6. The computer system of claim 1, wherein the authentication score is calculated on a scale.

7. The computer system of claim 1, comprising further instructions which, when executed by the one or more processors, cause the computer system to synchronize the mobile wallet with a client device.

8. The computer system of claim 1, comprising further instructions which, when executed by the one or more processors, cause the computer system to receive the mobile driver's license from a governmental agency.

9. A method for extending secure information stored within a mobile wallet, comprising:

storing a mobile driver's license of an individual in the mobile wallet, wherein the mobile wallet is a program executed on a computer system, and wherein the mobile wallet stores additional digital items including at least one payment credential comprising a virtual representation of a payment card synchronized with the mobile wallet and usable to conduct a transaction;

receiving extended information from the individual upon verification of the individual using the mobile driver's license, wherein the extended information is configurable by the individual;

adding the extended information to the mobile wallet that is associated with the mobile driver's license, the extended information being additional authentication information associated with the individual and stored as authenticated ground-truth data elements deemed authentic based on an association with the mobile driver's license;

storing a denial data set in the mobile wallet, the denial data set comprising values for information data fields determined to be associated with a fraudulent user account action, wherein the denial data set is populated based upon multiple fraudulent user account access attempts;

receiving a request from a third party device to authenticate the individual in response to a user account action of the individual with the third party device, the request including parameters of the user account action as request information, wherein the parameters include at least one of an email address used in the user account action, a phone number used in the user account action, a device identifier, and location information;

calculating an authentication score based upon a comparison of the request information to the extended information and the denial data set; and returning a determination of authentication to the third party device in response to the request, the determination indicating whether the user account action is legitimate or potentially fraudulent.

10. The method of claim 9, wherein the extended information is at least one of an email address and a phone number.

11. The method of claim 9, further comprising associating the extended information with the mobile driver's license.

12. The method of claim 11, wherein the extended information is immutable.

13. The method of claim 9, wherein the request is associated with accessing an account.

14. The method of claim 9, wherein the authentication score is calculated on a scale.

15. The method of claim 9, further comprising synchronizing the mobile wallet with a client device.

16. The method of claim 9, further comprising receiving the mobile driver's license from a governmental agency.

17. A computer system for extending secure information stored within a mobile wallet, comprising:

one or more processors; and non-transitory computer-readable storage media encoding instructions which, when executed by the one or more processors, cause the computer system to:

receive a mobile driver's license from a governmental agency;

store the mobile driver's license of an individual in the mobile wallet, wherein the mobile wallet is a program executed on the computer system, and wherein the mobile wallet stores additional digital items including at least one payment credential comprising a virtual representation of a payment card synchronized with the mobile wallet and usable to conduct a transaction;

receive extended information from the individual upon verification of the individual using the mobile driver's license, wherein the extended information is at least one of an email address and a phone number;

add the extended information to the mobile wallet that is associated with the mobile driver's license, the extended information being additional authentication information associated with the individual and stored as authenticated ground-truth data elements deemed authentic based on an association with the mobile driver's license;

store a denial data set in the mobile wallet, the denial data set comprising values for information data fields determined to be associated with a fraudulent user account action, wherein the denial data set is populated based upon multiple fraudulent user account access attempts;

associate the extended information with the mobile driver's license;

receive a request from a third party device to authenticate the individual in response to a user account action of the individual with the third party device, the request including parameters of the user account action as request information, wherein the parameters include at least one of the email address used in the user account action, the phone number used in the user account action, a device identifier, and location information;

calculate an authentication score based upon a comparison of the request information to the extended information and the denial data set, wherein the authentication score is calculated on a scale; and return a determination of authentication to the third party device in response to the request, the determination indicating whether the user account action is legitimate or potentially fraudulent.

* * * * *